United States Patent
Kroeger

(10) Patent No.: US 10,035,266 B1
(45) Date of Patent: Jul. 31, 2018

(54) GENERATING ROBOT TRAJECTORIES USING A REAL TIME TRAJECTORY GENERATOR AND A PATH OPTIMIZER

(71) Applicant: X DEVELOPMENT LLC, Mountain View, CA (US)

(72) Inventor: Torsten Kroeger, Los Altos Hills, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 44 days.

(21) Appl. No.: 15/376,011

(22) Filed: Dec. 12, 2016

Related U.S. Application Data

(60) Provisional application No. 62/280,017, filed on Jan. 18, 2016.

(51) Int. Cl.
  *G06F 19/00* (2018.01)
  *B25J 9/16* (2006.01)
(52) U.S. Cl.
  CPC .................................. *B25J 9/1664* (2013.01)
(58) Field of Classification Search
  None
  See application file for complete search history.

(56) References Cited

U.S. PATENT DOCUMENTS

| | | | |
|---|---|---|---|
| 4,772,831 A | 9/1988 | Casler, Jr. et al. | |
| 5,594,644 A | 1/1997 | Hasegawa et al. | |
| 7,130,716 B2 | 10/2006 | Rogers et al. | |
| 7,449,857 B2 | 11/2008 | Ohta et al. | |
| 7,462,998 B2 | 12/2008 | Akiyama | |
| 7,853,356 B2 | 12/2010 | Tsai et al. | |
| 8,185,265 B2 | 5/2012 | Nagano | |
| 2010/0204828 A1 | 8/2010 | Yoshizawa et al. | |
| 2012/0158178 A1 | 6/2012 | Hyung et al. | |
| 2013/0307459 A1 | 11/2013 | Tian | |

OTHER PUBLICATIONS

Bobrow, J. E. (1988). Optimal Robot Plant Planning Using the Minimum-Time Criterion. Robotics and Automation, IEEE Journal of, 4(4), 443-450.

*Primary Examiner* — Bhavesh V Amin
(74) *Attorney, Agent, or Firm* — Middleton Reutlinger

(57) ABSTRACT

Methods, apparatus, systems, and computer readable media are provided for generating a trajectory for a robot to enable a reference point of the robot to reach a target waypoint. A real time trajectory generator is utilized to generate a first segment of a trajectory toward a target waypoint. While the robot is traversing the first segment of the trajectory, a trajectory optimizer is utilized to generate a second segment of the trajectory from an "end point" of the first segment (an actual end of the first segment or a defined "hand off" point) until the target waypoint is reached (or until an intermediate waypoint is reached). The trajectory optimizer may utilize anticipated motion states of one or more actuators of the robot at the end point of the first segment in generating the second segment.

20 Claims, 7 Drawing Sheets

GENERATING ROBOT TRAJECTORIES USING A REAL TIME TRAJECTORY GENERATOR AND A PATH OPTIMIZER

BACKGROUND

Robots may be programmed to perform a variety of tasks and often must follow one or more trajectories in performing programmed tasks. For example, to retrieve an object and place the object in a container, one or more operational components of a robot may follow a first trajectory to reach a pick up location for the object, then after picking up the object may follow a second trajectory to reach a location for placing the object in the container.

Various techniques may be employed for determining a trajectory to be followed by a robot in performance of a task. For example, some robots may be configured to learn trajectories based on the user physically manipulating the robot. Also, for example, some robots may be configured to automatically determine an appropriate trajectory for performing a task based on sensed environmental conditions and/or other factors. For instance, some robots may determine a trajectory to an object based on detecting a position of the object, then using a trajectory planner to determine an acceptable trajectory to reach the position of the object. However, robots configured to automatically determine trajectories may suffer from one or more drawbacks.

SUMMARY

The present disclosure is generally directed to generating a trajectory for a robot to enable a reference point of the robot to reach a target waypoint (e.g., to reach the target waypoint with a target motion state). More particularly, the present disclosure is directed to utilizing a real time trajectory generator to generate a first segment of a trajectory toward a target waypoint; and while the robot is traversing the first segment of the trajectory, utilizing a trajectory optimizer to generate a second segment of the trajectory from an "end point" of the first segment (an actual end of the first segment or a defined "hand off" point) until the target waypoint is reached (or until an intermediate waypoint is reached). The trajectory optimizer may utilize anticipated motion states of one or more actuators of the robot at the end point of the first segment in generating the second segment.

The generated trajectory indicates one or more motion states (e.g., positions, velocities, and/or accelerations) of one or more actuators of the robot over time that enable a path to be traversed by a reference point of the robot toward the target waypoint. A reference point of the robot may be, for example, a reference point of an end effector of the robot.

In some implementations, at least portions of the first segment of the trajectory can be generated by the real time trajectory generator in real time (i.e., in a single control cycle of the robot), thereby allowing the robot to quickly (e.g., in the same control cycle) begin traversal toward the target waypoint using the first trajectory. On the other hand, in some implementations the second segment of the trajectory cannot be generated in real time, but may be more optimal (according to one or more optimization criteria of the trajectory optimizer) than a trajectory segment that would be generated by the real time trajectory generator. According to techniques described herein, the trajectory optimizer may determine the second segment of the trajectory while the first segment is being traversed and may do so in view of anticipated motion states at the end of the first segment to ensure a smooth handoff between the two segments of the trajectory and/or to enable optimization of the second segment in view of the provided anticipated motion states at the end of the first segment. Thus, a hybrid trajectory may be achieved, where the first part of the trajectory is based on the first segment generated by the real time trajectory generator and the second part of the trajectory is based on the second segment generated by the trajectory optimizer.

In some implementations, torque constraints are determined for each of a plurality of actuators of the robot. The torque constraints may optionally be determined based on the motion states of the actuators prior to determining the first segment of the trajectory. Using an inverse dynamic model with components for inertial, gravitational, centrifugal, and Coriolis forces/torques, the torque constraints are utilized to determine asymmetric acceleration constraints that are then utilized by the real time trajectory generator to determine the first segment. As a result, in those implementations the motion states for the first segment are determined in view of the asymmetric acceleration constraints and the anticipated motion states that are provided to the trajectory optimizer (those that define the anticipated motion states at the end point of the first segment) are resultantly affected by the asymmetric acceleration constraints.

In some implementations, a method of generating a trajectory for a robot may be provided that includes identifying a plurality of sequential waypoints and generating, by a real time trajectory generator, a first segment of a trajectory toward a first waypoint of the waypoints. The first segment indicates one or more motion states of actuators of the robot at each of a plurality of times. At least a portion of the first segment is generated by the real time trajectory generator within a control cycle of the robot and the first segment is generated based on the first waypoint and based on one or more kinematic motion constraints of the robot. The method further includes providing, to a trajectory optimizer, anticipated motion states of the motion states of the actuators, the anticipated motion states being the motion states of the first segment for a target time of the plurality of times. The method further includes operating the actuators of the robot based on the first segment until the target time and generating, by the trajectory optimizer and during the operating of the actuators of the robot based on the first segment, a second segment of the trajectory toward a last waypoint of the waypoints. The second segment indicates the motion states of the actuators of the robot at each of a plurality of second segment times following the target time. The second segment is generated based on one or more of the waypoints, based on one or more optimization parameters, and based on the anticipated motion states provided to the trajectory optimizer. The method further includes operating the actuators of the robot based on the second segment following the target time.

This method and other implementations of technology disclosed herein may each optionally include one or more of the following features.

In some implementations, the method further includes: determining current motion states for the actuators of the robot in the control cycle of the robot in which the first segment is generated and determining asymmetric acceleration constraints for one or more of the actuators based on the current motion states for the actuators of the robot. The kinematic motion constraints utilized in generating the first segment may include values based on the asymmetric acceleration constraints. In some versions of those implementations, the values based on the asymmetric acceleration constraints are the determined asymmetric acceleration constraints. In some other versions of those implementations, the method further includes reducing the asymmetric acceleration constraints by a percentage or a value to generate the values based on the asymmetric acceleration constraints. In various implementations, determining the asymmetric acceleration constraints for the one or more of the actuators based on the current motion states for the actuators of the robot includes: determining torque constraints for the one or more of the actuators based on the current motion states for the actuators of the robot; and determining the asymmetric acceleration constraints based on the torque constraints. In some of those various implementations, determining the asymmetric acceleration constraints based on the torque constraints includes: determining first direction acceleration constraints of the asymmetric acceleration constraints during a call of a forward dynamic model of the robot based on the current motion state and first direction torque values of the torque constraints; and determining second direction acceleration constraints of the asymmetric acceleration constraints during a separate call of the forward dynamic model of the robot based on the current motion state and second direction torque values of the torque constraints.

In some implementations, operating the actuators of the robot based on the first trajectory starts in or before a next control cycle of the robot that immediately follows the control cycle of the robot in which the at least the portion of the first segment is generated.

In some implementations, providing the anticipated motion states to the trajectory optimizer occurs within the control cycle of the robot in which the at least the portion of the first segment is generated.

In some implementations, the real time trajectory generator generates the first segment to achieve a locally time optimal trajectory for the current motion state.

In some implementations, the kinematic constraints based on which the real time trajectory generator generates the first segment exclude torque constraints. In some of those implementations, the trajectory optimizer generates the second segment based on the torque constraints.

In some implementations, the method further includes identifying a plurality of overriding sequential new waypoints during the operating of the actuators of the robot based on the second segment and in response to identifying the new waypoints during the operating of the actuators of the robot based on the second segment: generating, by the real time trajectory generator, a third segment of a new trajectory toward a new first waypoint of the new waypoints, the third segment indicating the motion states of the actuators of the robot at each of a plurality of third segment times; providing, to the trajectory optimizer, third segment anticipated motion states of the motion states of the actuators, the third trajectory anticipated motion states being the motion states of the third segment for a third segment target time of the plurality of third segment times; operating the actuators of the robot based on the third segment until the third segment target time; generating, by the trajectory optimizer during the operating of the actuators of the robot based on the third segment, a fourth segment of the new trajectory, the fourth segment generated based on the one or more optimization parameters and based on the third segment anticipated motion states provided to the trajectory optimizer; and operating the actuators of the robot based on the fourth segment following the third segment target time. In some of those implementations, identifying the new waypoints is in response to a sensor event of the robot during the operating of the actuators of the robot based on the second segment. As one example, the sensor event may indicate an obstacle that was not present during the generating of the second segment by the trajectory optimizer.

In some implementations, the method further includes: generating, by the trajectory optimizer during the operating of the actuators of the robot based on the second segment, a third segment of the trajectory toward the last waypoint, the third segment indicating the motion states of the actuators of the robot at each of a plurality of third segment times following a second segment target time of the second segment times, the third segment generated based one or more optimization parameters and based on second segment anticipated motion states, the second segment anticipated motion states being the motion states of the second segment for the second segment target time; and operating the actuators of the robot based on the third segment following the second trajectory target time.

In some implementations, a robotic system is provided that includes a plurality of actuators, logic, a real time trajectory generator, and a trajectory optimizer. The logic provides control commands to the actuators to control the actuators. The real time trajectory generator is configured to generate a first segment of a trajectory toward a first waypoint of a plurality of sequential waypoints. The first segment indicates one or more motion states of the actuators at each of a plurality of times. The real time trajectory generator generates at least a portion of the first segment within a control cycle and the first segment is generated based on the first waypoint and based on one or more kinematic motion constraints. The logic provides control commands to the actuators to operate the actuators based on the first segment until the target time. The trajectory optimizer is configured to generate, during the operating of the actuators of the robot based on the first segment, a second segment of the trajectory toward a last waypoint of the waypoints. The second segment indicates the motion states of the actuators of the robot at each of a plurality of second segment times following the target time. The trajectory optimizer generates the second segment based on one or more of the waypoints, based on one or more optimization parameters, and based on anticipated motion states. The anticipated motion states are the motion states of the first segment for a target time of the plurality of times. The logic provides control commands to the actuators to operate the actuators based on the second segment following the target time.

Other implementations may include a non-transitory computer readable storage medium storing instructions executable by a processor to perform a method such as one or more of the methods described above. Yet another implementation may include a robot and/or robotic control system including memory and one or more processors operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 3 illustrates the positions traversed by the reference point of the robot based on a trajectory and also illustrates two orientations of a set of orientations struck by the robot based on the trajectory.

DETAILED DESCRIPTION

As used herein, a trajectory indicates one or more motion states (e.g., position, velocity, and/or acceleration) of each of one or more actuators of a robot over time. For example, for a robot arm with six actuators, a trajectory may be expressed as positions of the six actuators for each of a plurality of control cycles. Accordingly, because the trajectory is expressed as positions over time, the trajectory defines the positions, the velocities (derivatives of the positions), and the accelerations (derivatives of the velocities) of the six actuators at each of a plurality of time periods. Stated differently, a trajectory indicates a motion profile for transitioning each of one or more actuators of a robot from a respective current motion state to a respective target motion state to cause a reference point of the robot to traverse a plurality of positions in moving from a current waypoint to a target waypoint (while optionally encountering one or more intermediate waypoints of a set of waypoints).

Figure 1:
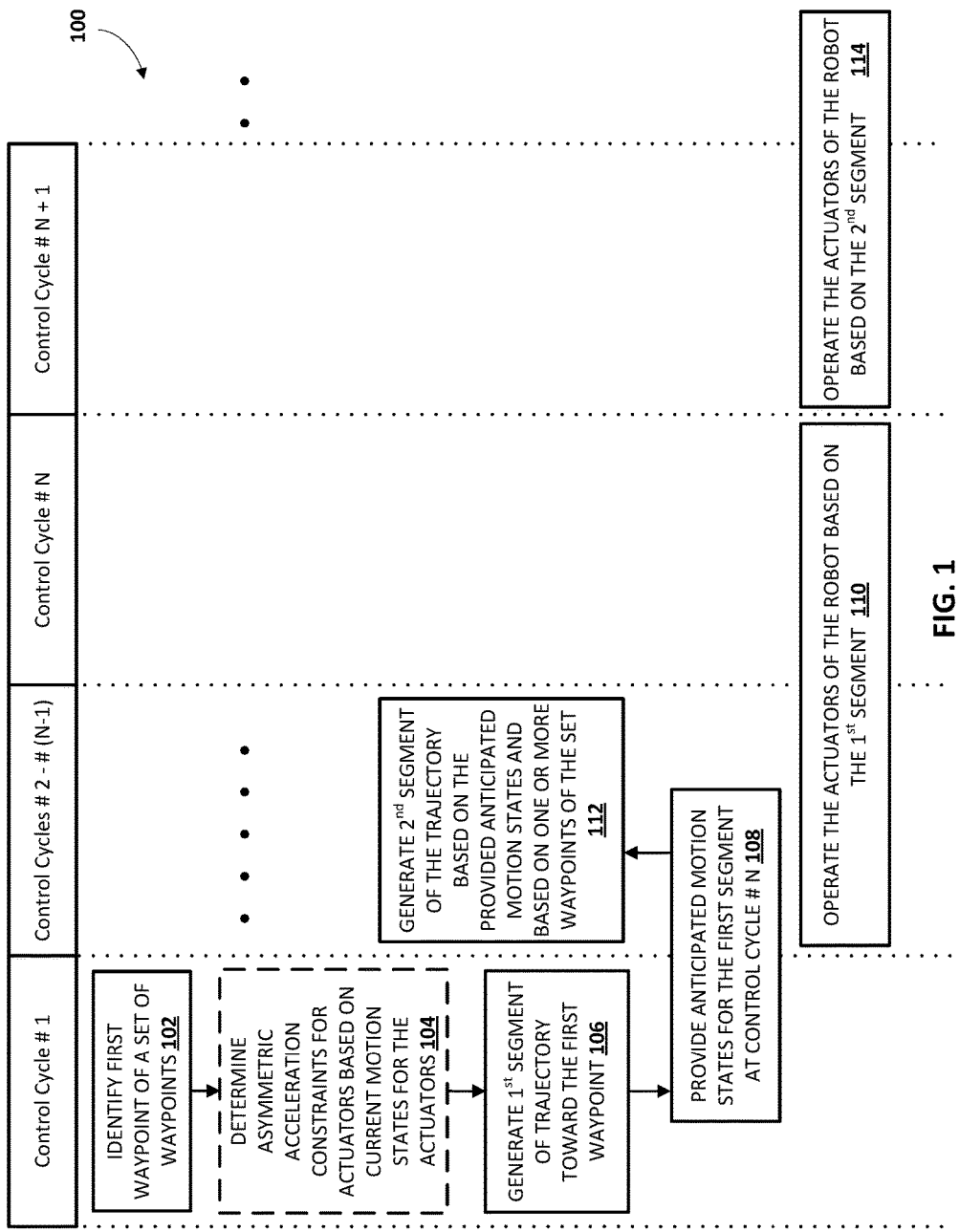
FIG. 1 depicts a flow chart illustrating an example method of generating a trajectory toward a target waypoint and illustrates example robot control cycles in which various steps of the example method may be implemented.

Referring now to FIG. 1, an example method 100 of generating a trajectory toward a target waypoint is illustrated. The method 100 is illustrated with example robot control cycles in which various steps may be implemented. For convenience, the operations of method 100 are described with reference to a system that performs at least some of the operations and is described with reference to a robot in which the system is incorporated and/or with which the system communicates. This system may include various components, such as trajectory generation system 550 and/or logic 502 in FIG. 5. While operations of method 100 are shown in a particular order, this is not meant to be limiting. One or more operations may be reordered, omitted or added.

At block 102, the system identifies at least a first waypoint of a set of a plurality of sequential waypoints. For example, the set of waypoints may include one or more user inputted waypoints, one or more stored waypoints retrieved from memory, and/or one or more waypoints automatically determined by the system and/or another component of the robot. For instance, a plurality of user inputted sequential waypoints may be defined in response to sequential instances of a user, during a "training mode," physically manipulating a robot and actuating a user interface element (i.e., each actuation defines a waypoint that corresponds to the position of a reference point of the robot at the time of the actuation). Also, for instance, a plurality of user inputted sequential waypoints may be defined in response to a user providing input via one or more user interface input devices of a computing device to define the waypoints. For instance, the computing device may generate a graphical user interface displaying an environment around a robot and the user may provide input via the graphical user interface to select positions in the environment to utilize as the waypoints.

As one example of a set of stored waypoints retrieved from memory, the waypoints may be waypoints defined as part of a program or task being executed by the robot. For instance, the robot may be programmed to move a reference point of the robot from a current position to one or more waypoints upon occurrence of one or more events, such as upon the occurrence of certain output from one or more sensors of the robot. As one example of an automatically determined set of waypoints, a component of a robot (e.g., a higher level path planner) may determine the waypoints based on analysis of data from one or more sensors of the robot. For instance, the component of the robot may analyze image data from a camera, depth data from a depth sensor, etc. to detect an object and may utilize a position of the object to generate one or more waypoints to reach the object. Also, for instance, the component of the robot may analyze image data and/or depth data to detect obstacles and may determine one or more positions that avoid one or more of the obstacles as the waypoints.

The first waypoint and other waypoint(s) of the set may be expressed in Cartesian space and/or robot joint space and each waypoint defines a position to be traversed to by a reference point of a robot, such as a reference point of an end effector of the robot. Block 102 is performed by the system in what is labeled in FIG. 1 as control cycle #1 of the robot. It is noted that the presence of "#1" in control cycle #1 does not mean that the control cycle is necessarily the very first control cycle of the robot. Rather, "#1" is provided merely as a reference for an initial control cycle in which the method 100 may begin. In some implementations, the length of each control cycle is approximately one millisecond. In some implementations, the length of each control cycle is less than one millisecond.

At optional block 104, the system determines asymmetric acceleration constraints for each of one or more actuators of the robot based on the current motion states for the actuators of the robot. The current motion states for the actuators may be obtained, for example, based on sensor output of one or more sensors of the robot and/or other feedback signal from the robot. In some implementations, the system determines the asymmetric acceleration constraints based on the motion states of the actuators, values related to masses of various robot components, values related to masses of non-robot objects being grasped or otherwise held by the robot, and/or or other factors. Block 104 is performed by the system in what is labeled in FIG. 1 as control cycle #1 of the robot.

In some implementations, at block 104 the system determines asymmetric acceleration constraints based on current motion states for the actuators and the torque constraints for the actuators. In some of those implementations, the asymmetric acceleration constraints are determined in view of a mapping for the robot (e.g., torque constraints mapping 560) that defines, for each of a plurality of motion states of the robot, maximum and minimum torque vectors for actuators of the robot in the motion state.

One example is provided of asymmetric acceleration constraints with respect to a robot that is a so called "robot arm". When the robot is a robot arm extended "straight out" (e.g., planar to the floor), a maximum acceleration constraint for an actuator of the robot when the actuator is moved in a direction toward the floor is greater than the maximum acceleration constraint for that actuator when it is moved in a direction away from the floor (i.e., due to gravitational forces). Coriolis/centrifugal forces may also be taken into account in determining asymmetric acceleration constraints. Note that the velocity and acceleration constraints of the starting motion states will be "null" if the actuators are not in motion at control cycle #1 (but the motion states will define non-null positions for the actuators), whereas the velocity and acceleration constraints for one or more of the actuators will not be "null" if the robot is in motion at control cycle #1.

As described above, torque constraints may be utilized to determine asymmetric acceleration constraints. For example, the system may utilize a mass matrix that maps actuator forces/torques to acceleration constraints, taking into account additional asymmetric force/torque constraints as an offset. In some implementations, the system may utilize a forward dynamic model of the robot that enables computation of a torque space on given motion states for actuators to determine the asymmetric acceleration constraints. For example, a first call of the forward dynamic model with maximum torque constraints for each of the actuators in a first direction may be utilized to determine a vector of maximum acceleration constraints in the first direction. A second call of the forward dynamic model with maximum torque constraints for each of the actuators in a second direction opposite to the first direction may be utilized to determine a vector of maximum acceleration constraints in the second direction. The asymmetric acceleration constraints may be based on the two maximum acceleration constraints vectors. For example, each of the vectors may be utilized as the asymmetric acceleration constraints and/or the values of the vectors may be reduced by a certain value or percentage and the reduced values utilized. Reducing the values of the vectors may ensure that the values will be achieved at the "handoff" to the second segment of the trajectory since the motion state at control cycle #1 is used in determining the acceleration constraints vectors (and the achievable acceleration constraints at the handoff point in some instances may vary from those achievable based on the "current" motion state).

At block 106, the system generates a first segment of a trajectory toward the first waypoint. A real time trajectory generator of the system may be utilized to generate the first segment based on the first waypoint and based on one or more kinematic constraints of the robot. In some of those implementations, the real time trajectory generator utilizes a real time online trajectory algorithm to generate a locally time optimal trajectory. For example, the real time trajectory generator may use a real time online trajectory algorithm that utilizes one or more decision trees and/or motion libraries to generate a trajectory that is time optimal for the motion states for the actuators at control cycle #1.

The first segment generated by the system at block 106 indicates one or more motion states of actuators of the robot at each of a plurality of times. In some implementations, and as illustrated in FIG. 1, at least a portion (e.g., all) of the first segment is generated by the real time trajectory generator of the system in control cycle #1 of the robot.

As one example of the first segment generated at block 106, the first segment may define position, velocity, and/or acceleration (P, V, A) vectors (e.g., each value of a vector may define a value for one of the actuators of the robot) for each of a plurality of time instants. For instance, the vectors may be defined for each of a plurality of control cycles. The number of control cycles for which the vectors are defined may be selected in view of various considerations such as, for example, a maximum amount of time required by a trajectory optimizer of the system to generate an optimized path, an amount of time in which dynamics of the robot can be assumed to remain relatively constant (since the first segment may be locally-time optimal and may become less optimal the further the robot moves from its current motion state), etc.

The one or more kinematic constraints of the robot that may be utilized by the system in generating the first trajectory include, for example, minimum/maximum velocities, minimum/maximum positions, minimum/maximum accelerations, minimum/maximum jerks, and/or minimum/maximum jounces. The kinematic constraints may be determined in view of a dynamic model of the robot and utilized by the real time trajectory generator in generating the first trajectory. As described herein, in some implementations the minimum/maximum accelerations utilized by the real time trajectory generator in generating the first segment may be asymmetric acceleration constraints. As a result, in those implementations the motion states for the actuators for the first segment are determined in view of the asymmetric acceleration constraints and the anticipated motion states that are provided to the trajectory optimizer in block 108 (described below) are resultantly affected by the asymmetric acceleration constraints.

At block 108, the system provides, to a trajectory optimizer, anticipated motion sates for the actuators for the end of the first segment at control cycle #N. The provided anticipated motion states at control cycle #N indicate the anticipated motion states for the actuators at an end point of the first segment of the trajectory. The value for "N" may be selected in view of various considerations such as, for example, a maximum amount of time required by a trajectory optimizer of the system to generate an optimized path, an amount of time in which dynamics of the robot can be assumed to remain relatively constant, etc. In some implementations, the value of N may be in the range of 2 to 100, such as 20. The system provides the anticipated motion states to the trajectory optimizer in advance of control cycle # N. In some implementations, the anticipated motion states are provided to the trajectory optimizer in control cycle #1 or control cycle #2.

At block 110, the system operates the actuators of the robot based on the first trajectory generated at block 106. In some implementations, the system operates the actuators of the robot based on the first segment starting in control cycle #2 and continues operation based on the first segment through control cycle #N. In some other implementations, the system operates the actuators of the robot based on the first segment starting in control cycle #1 and continues operation based on the first segment through control cycle #N.

At block 112, a trajectory optimizer of the system generates a second segment of the trajectory based on the anticipated motion states provided at block 108 and based on one or more (e.g., all) of the waypoints of the set of waypoints. The trajectory optimizer generates the second segment while the system is operating the actuators of the robot based on the first trajectory at block 110. The system generates the second segment of the trajectory prior to the end of control cycle #N of the robot. In some implementations, the system begins generating the second segment of the trajectory in control cycle #2 of the robot.

The trajectory optimizer determines the second segment from an end point of the first segment to the last waypoint of the set of waypoints (or other intermediate waypoint). The trajectory optimizer determines the second segment based on the anticipated motion states provided at block 108, based on one or more (e.g., all) of the waypoints of the set of waypoints of block 102, based on the optimization parameters of the trajectory optimizer, and optionally based on other parameters (e.g., motion constraints for the robot, a target state of motion at the last waypoint of the set of waypoints). Various techniques may be utilized by the trajectory optimizer to generate the second segment. For example, gradient optimization techniques may be utilized such as techniques that first find a feasible path, then iteratively optimize it to find the "shortest distance" path, to remove redundant and/or "jerky" motion, and/or in view of other optimization parameters. As one specific example, the second segment may be generated utilizing techniques based on Covariant Hamiltonian Optimization for Motion Planning (CHOMP). It is noted that the second segment generated by the trajectory optimizer need not be truly optimal in all implementations. In other words, the optimized path may represent a path generated based on sufficient convergence by the trajectory optimizer in view of optimization parameters of the trajectory optimizer, but is not necessarily a fully converged/optimized path.

At block 114, the system operates the actuators of the robot based on the second trajectory generated at block 112. The system operates the actuators of the robot based on the second segment starting in control cycle #N+1 of the robot. Accordingly, the second segment of the trajectory takes over at control cycle #N+1 and is utilized as the operational trajectory. Because the trajectory optimizer determines the second segment in view of anticipated parameters at the end of the first segment, a smooth "handoff" will occur between the two segments. In some implementations, the system continues operation based on the second segment until the last waypoint is reached, an intermediate control cycle is reached, and/or an overriding set of waypoints is identified.

In some implementations, the trajectory optimizer (or an additional trajectory optimizer) may use anticipated motion states of the actuators for the second segment at a control cycle that is prior to the last waypoint of the set of waypoints being reached to generate a third segment of the trajectory toward the last waypoint. For example, while the second segment is being traversed, the trajectory optimizer may utilize the anticipated motion state for the second trajectory at a future control cycle (i.e., an intermediate waypoint) to generate a third segment of the trajectory toward the last waypoint. In some implementations, the trajectory optimizer may utilize the second segment as a starting trajectory and further optimize the second segment to generate the third segment. At the end of operation of the robot based on the second segment, the generated third segment may then take over and be utilized as the operational trajectory. This may be repeated until the last waypoint is reached to iteratively generate more trajectory segments during traversal toward the last waypoint.

In some implementations, the method 100 may restart at block 102, 104, and/or 106 in response to one or more conditions being met. For example, the method 100 may restart at block 104 in response to an error condition such as the actual motion state at control cycle #N varying from the anticipated motion state of block 108 by at least a threshold amount. Also, for example, the method 100 may restart at block 102 in response to an overriding new set of one or more waypoints being identified. The new set of waypoints may be, for example, user inputted waypoints, stored target waypoints retrieved from memory, and/or may be waypoints automatically determined by the system and/or another component of the robot.

Figure 2:
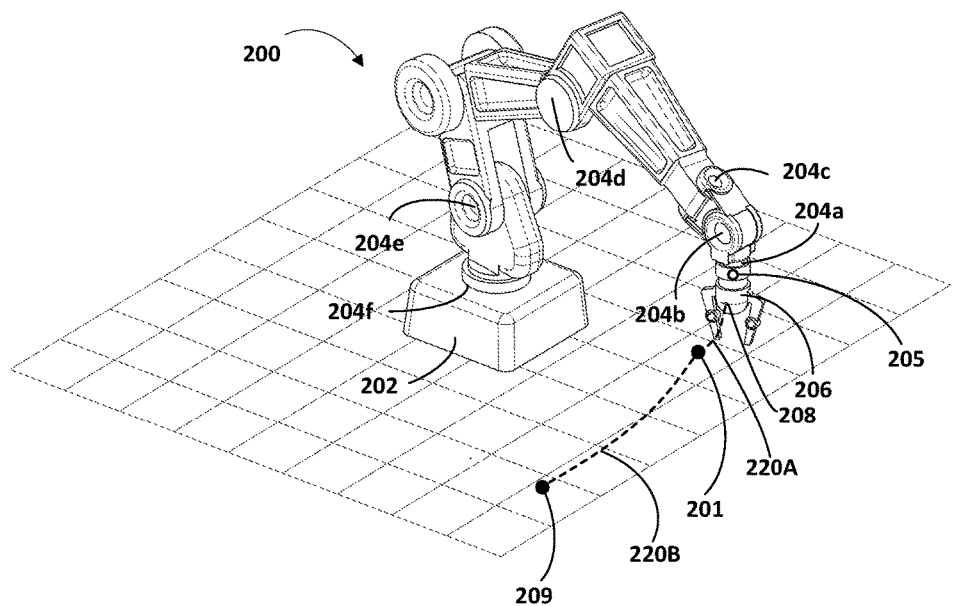
FIG. 2 illustrates an example robot and graphical representations of the positions traversed by a reference point of the robot to reach a target waypoint based on first and second segments of a trajectory generated according to techniques disclosed herein.

FIG. 2 illustrates an example robot 200 (in a form often referred to as a "robot arm") that includes a base 202 and a plurality of actuators, six of which are referenced in FIG. 2 with 204a-f. Robot 200 may include other actuators, but those are not labeled in FIG. 2 for the sakes of clarity and brevity. As used herein, an "actuator" of a robot may refer to motors (e.g., servo motors), joints, shafts, gear trains, pumps (e.g., air or liquid), pistons, drives, or other components that may create and/or undergo propulsion, rotation, and/or motion. Some actuators may be independently controllable, although this is not required. In some instances, the more operational components robot 200 has, the more degrees of freedom of movement it may have.

Figure 3:
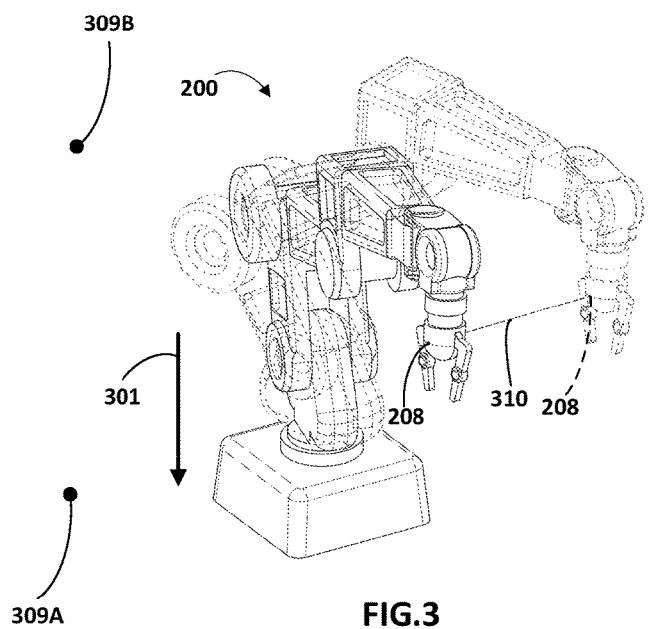
FIG. 3 illustrates the example robot of FIG. 2.

Robot 200 also includes an end effector 206. As used herein, "end effector" may refer to a variety of tools that may be operated by robot 200 in order to accomplish various tasks. In FIGS. 2 and 3 herein, for example, end effector 206 takes the form of a claw with two opposing "fingers" or "digits." The claw is one type of "gripper" known as an "impactive" gripper. Other types of grippers may include but are not limited to "ingressive" (e.g., physically penetrating an object using pins, needles, etc.), "astrictive" (e.g., using suction or vacuum to pick up an object), or "contigutive" (e.g., using surface tension, freezing or adhesive to pick up object). More generally, other types of end effectors may include but are not limited to drills, brushes, force-torque sensors, cutting tools, deburring tools, welding torches, and so forth. In some implementations, end effector 206 may be removable, and various types of modular end effectors may be installed onto robot 200, depending on the circumstances.

End effector 206 may define an abstract reference point 208. Reference point 208 may be a point of end effector 206 that traverses a particular path toward a target/last waypoint when robot 200 moves based on a trajectory generated to reach the target waypoint (while optionally encountering additional intermediate waypoints while traversing toward the target waypoint). In some implementations, reference point 208 may be a center of gravity of end effector 206, and/or a point near where end effector 206 attaches to robot 200, though this is not required.

Robots typically, and robot 200 in particular, may have multiple degrees of freedom of movement. For example, each of the actuators 204a-f may be a servo motor that enables controllable rotation about a respective axis. Accordingly, it is possible for robot 200 to traverse any one of a plurality of trajectories when moving reference point 208 from a first location to a second location. Moreover, the multiple degrees of freedom of the robot 200 enable the robot to traverse along the same path in multiple ways, each time striking a different set of orientations along the path. As used herein, an "orientation" refers to a particular configuration of components of a robot relative to one another at a particular position of the reference point 208 (e.g., a "snapshot"). When robot 200 is inactive, it may be in (or "strike") a single orientation until it moves again. When robot 200 moves the reference point 208 it may strike a series of orientations to effectuate the movement. Additionally, each of one or more of the actuators 204a-f may be operable at a plurality of velocities, enabling the robot to traverse the reference point 208 along the same path with different sets of velocities (and resultantly a different set of accelerations).

In the example of FIG. 2, a last waypoint 209 of a set of waypoints is illustrated. Other waypoints of the set of waypoints are not illustrated for sake of simplicity of FIG. 2. A path that includes a first segment 220A and a second segment 220B to the last waypoint 209 is also illustrated. The segments 220A, 220B provide a graphical representation of the positions traversed by the reference point 208 of the end effector 206 to reach the last waypoint 209 (while encountering other waypoints of the set). The first segment 220A is traversed based on a first segment of the trajectory generated by a real time trajectory generator as described herein and the second segment is traversed based on a second segment of the trajectory generated by a trajectory optimizer as described herein. For example, the first trajectory may be generated in real time and the reference point 208 may begin moving along first segment 220A from its illustrated position in real time based on the first trajectory. While the reference point 208 is moving along first segment 220A, the second portion of the trajectory may be generated and the reference point 208 may move along the second segment 220B based on the second trajectory starting at transition point 201. Transition point 201 indicates a position of the reference point 208 at which control of the trajectory of the robot 200 is switched from control based on the first segment 220A to control based on the second segment 220B. Transition point 201 may be before the first waypoint of a provided set of waypoints in some implementations.

FIG. 3 illustrates the example robot 200 of FIG. 2. The numbering of various components of the robot 200 is omitted in FIG. 3 for the sake of simplifying the figure. FIG. 3 includes a path 310 that illustrates the positions traversed by the reference point 208 of the robot 200 in traversing a trajectory. FIG. 3 also illustrates an orientation of the robot 200 at the beginning of the trajectory (illustrated in broken lines) and a current orientation of the robot 200 (illustrated in solid lines).

FIG. 3 also illustrates a first waypoint 309A and a second waypoint 309B. Waypoints 309A, 309B are illustrated as examples of how asymmetric acceleration constraints may optionally be utilized by the real time trajectory generator in generating a segment of a trajectory toward a waypoint. In FIG. 3, first waypoint 309A is in a "downward" direction relative to the current position of the reference point 208, whereas the second waypoint 309B is in an "upward" direction relative to the current position of the reference point 208. Accordingly, in traversing the reference point 208 in a direction toward the first waypoint 309A from its current position of FIG. 3, one or more actuators of the robot 200 may move in a respective direction that takes advantage of gravitational forces and achieve a higher maximum acceleration value in that direction than in an opposite respective direction. For example, in traversing toward the first waypoint 309A, an actuator of the robot 200 may be moved in a first direction that takes advantage of gravitational forces, whereas in traversing toward the second waypoint 309B the same actuator may be moved in a second direction that does not take advantage of gravitational forces. A gravity vector 301 is illustrated in FIG. 3 to provide an indication of the direction of the gravitational forces in FIG. 3.

The above description of FIG. 3 is provided with respect to gravitational forces, and with the assumption that the gravitational forces are the dominant force in the configuration of FIG. 3 (an assumption dependent on various considerations such as kinematic constraints and mass distribution within the robot links of the robot 200). However, it is understood that there will be situations where a given actuator may achieve a higher maximum acceleration value when moving in a direction that does not take advantage of gravitational forces than it would if it were instead moving in a direction that takes advantage of gravitational forces. In other words, it is understood that inertial, centrifugal, and Coriolis forces will also influence the maximum acceleration values achievable by the robots. As described herein, a dynamic model of the robot 200 may be utilized that takes into account inertial, centrifugal, Coriolis, and gravitational forces/torques in determining maximum acceleration constraints—thereby enabling determination of asymmetric acceleration constraints in view of all such forces/torques.

Figure 4A:
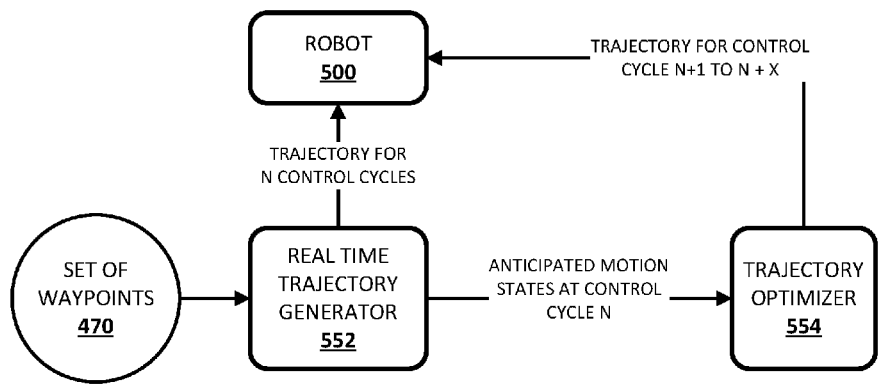
FIG. 4A illustrates an example of a real time trajectory generator generating a first segment of a trajectory to provide to a robot for traversal of the first segment for N control cycles and a trajectory optimizer generating a second segment of the trajectory to provide to the robot for traversal of the second segment following the Nth control cycle.

FIG. 4A illustrates an example of a real time trajectory generator 552 identifying a first waypoint of a set of waypoints 470 and generating a first segment of a trajectory based on the first waypoint. The real time trajectory generator 552 provides the first segment to a robot 500 for traversal of the first segment by the robot 500 for N control cycles. For example, the real time trajectory generator may be implemented by one or more processors of the robot and may provide the first segment as control commands to drivers of actuators of the robot. The real time trajectory generator 552 also provides, to the trajectory optimizer 554, anticipated motion states for actuators of the robot at control cycle N based on the first segment. The trajectory optimizer 554 generates a second segment of the trajectory based on the anticipated motion states and based on one or more (e.g., all) waypoints of the set of waypoints 470. The trajectory optimizer 554 provides the second segment to the robot 500 for traversal of the second segment by the robot 500 following the Nth control cycle.

Figure 4B:
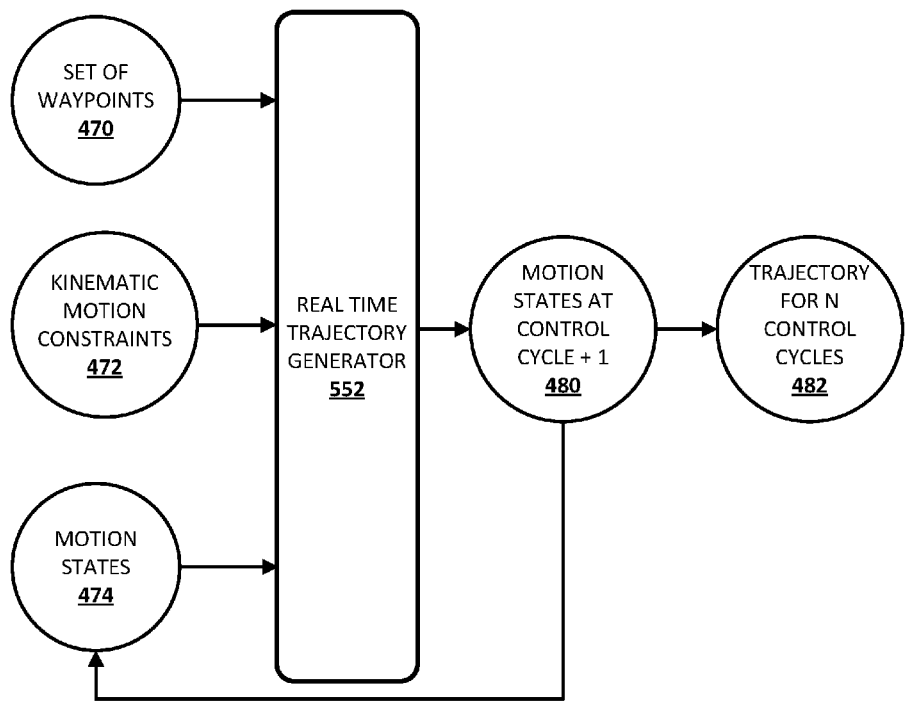
FIG. 4B illustrates a more detailed example of the real time trajectory generator generating a first segment of a trajectory to provide to the robot for traversal of the first segment for N control cycles.

FIG. 4B illustrates a more detailed example of the real time trajectory generator 552 generating a first segment of a trajectory to provide to the robot for traversal of the first segment for N control cycles. The first waypoint of the set of waypoints 470, kinematic motion constraints 472 of the robot, and current motion states 474 are provided as inputs to the real time trajectory generator 552. The real time trajectory generator 552 generates motion states at the next control cycle (control cycle+1) 480 based on the inputs. The motion states at the next control cycle 480 are added as part of the trajectory for the next N control cycles 482. In some implementations, the real time trajectory generator 552 generates motion states at the next control cycle 480 to achieve a time-optimal trajectory to reach the target waypoint 470 and may optionally utilize decision trees in generating the motion states at the next control cycle 480. The motion states at the next control cycle 480 are fed back and used as the current motion states 474 used to generate the next iteration of the motion states for the next control cycle 480 which, in turn, are added to the trajectory for the next N control cycles. Through one or more iterations, the real time trajectory generator 552 builds the trajectory for N control cycles 482 and provides it to the robot 500 for traversal by the robot 500 for N control cycles.

Figure 4C:
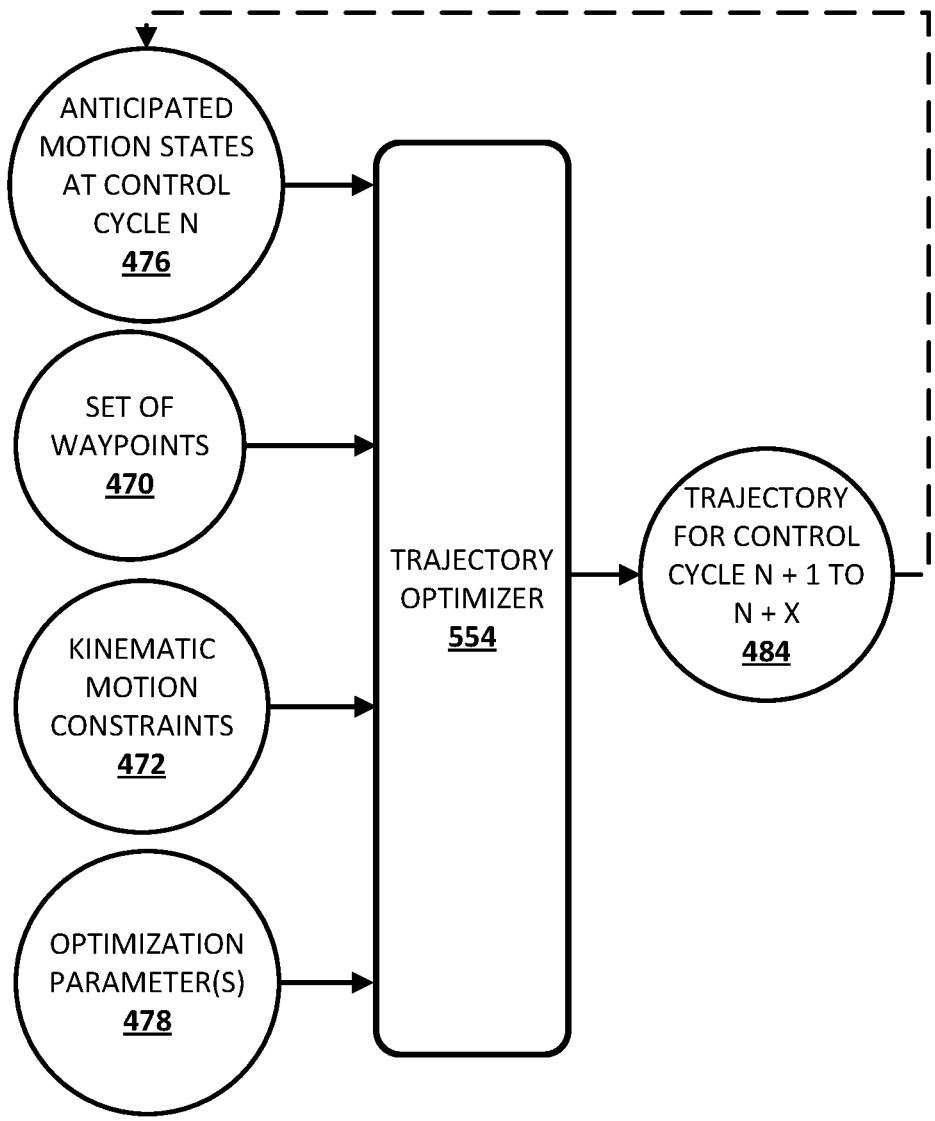
FIG. 4C illustrates a more detailed example of the trajectory optimizer generating a second segment of a trajectory to provide to the robot for traversal of the second segment following the Nth control cycle.

FIG. 4C illustrates a more detailed example of the trajectory optimizer 554 generating a second segment of a trajectory to provide to the robot 500 for traversal of the second segment following the Nth control cycle. Anticipated motion states at control cycle N 476, the set of waypoints 470, kinematic motion constraints 472 of the robot, and optimization parameter(s) 478 are provided as inputs to the trajectory optimizer 554. Additional parameters may be provided in other implementations. The trajectory optimizer 554 generates a trajectory for control cycle N+1 to N+X 484 based on the inputs. The trajectory optimizer provides the trajectory 484 to robot 500 for traversal by the robot 500 following the Nth control cycle.

In some implementations, the trajectory 484 is traversed by the robot 500 until the last waypoint of the set of waypoints 470 is reached. In some other implementations, the motion states for a future control cycle of the trajectory 484 that is prior to the last waypoint being reached are fed back as the anticipated motion states at control cycle N 476. The trajectory optimizer 554 may use the fed back anticipated motion states at control cycle N 476 to generate another segment trajectory toward the last waypoint. For example, while the previously generated segment is being traversed, the trajectory optimizer 554 may utilize the anticipated motion state for a target control cycle of the previously generated segment to generate another segment of the trajectory toward the last waypoint. At the end of operation of the robot 500 based on the previously generated segment (i.e., following the target control cycle), the additional generated segment may then take over and be utilized as the operational trajectory. This may be repeated until the last waypoint is reached to iteratively generate more trajectory segments during traversal toward the last waypoint.

It is noted that in some implementations the kinematic motion constraints 472 utilized by the real time trajectory generator 552 may vary from those utilized by the trajectory optimizer 554. For example, in some implementations the trajectory optimizer 554 may take into account torque constraints, whereas the real time trajectory generator 552 will not. Also, for example, in some implementations the real time trajectory generator 552 may take into account asymmetric acceleration constraints, whereas the trajectory optimizer 554 may take into account symmetric acceleration constraints.

Figure 5:
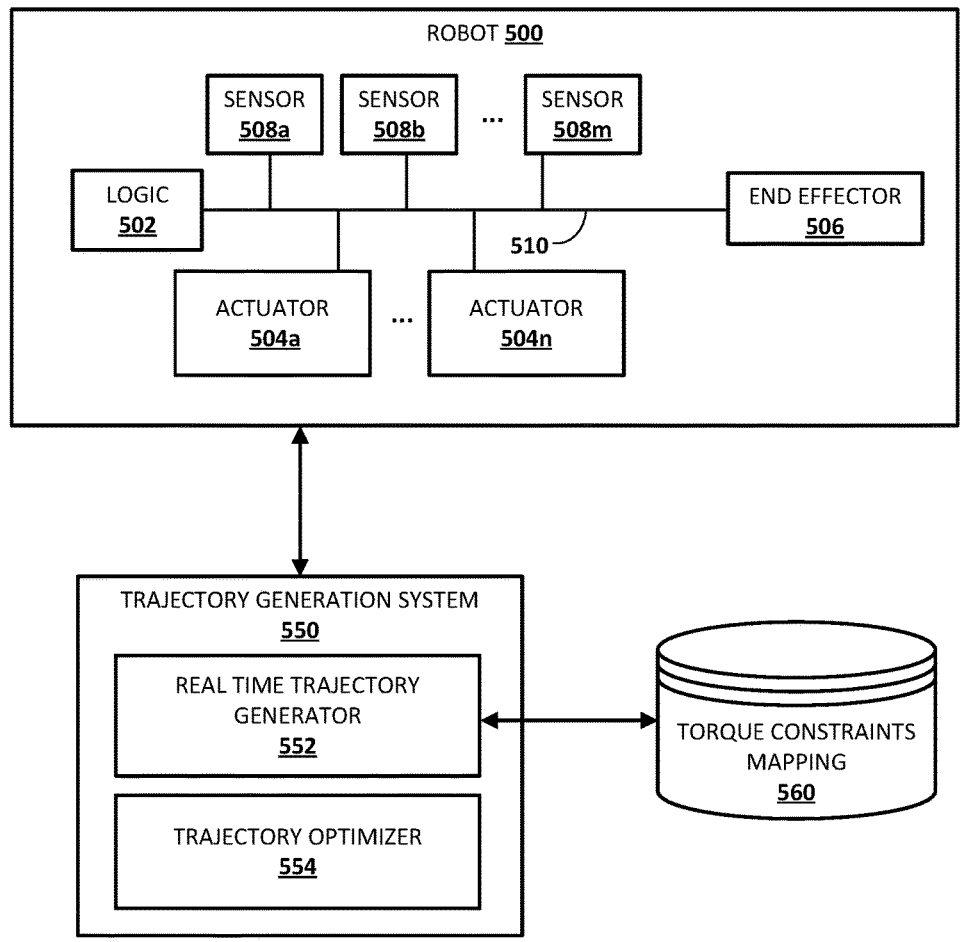
FIG. 5 illustrates an example environment in which disclosed techniques may be implemented.

FIG. 5 is a schematic diagram of an example environment in which disclosed techniques may be implemented. A robot 500 may be in communication with a trajectory generation system 550. Robot 500 may take various forms, including but not limited to a robot arm similar to robot 200 described above, a humanoid form, an animal form, a wheeled device, a submersible vehicle, an unmanned aerial vehicle ("UAV"), and so forth. In various implementations, robot 500 may include logic 502. Logic 502 may take various forms, such as one or more processors, one or more field-programmable gate arrays ("FPGA"), one or more application-specific integrated circuits ("ASIC"), one or more so-called "real time controllers," and so forth.

In various implementations, logic 502 may be operably coupled with one or more actuators 504a-n and/or one or more sensors 508a-m, e.g., via one or more buses 510. Sensors 508a-m may take various forms, including but not limited to light sensors, pressure sensors, pressure wave sensors (e.g., microphones), proximity sensors, accelerometers, gyroscopes, thermometers, barometers, and so forth. While sensors 508a-m are depicted as being integral with robot 500, this is not meant to be limiting. In some implementations, one or more sensors 508a-m may be located external to robot 500, e.g., as standalone units.

Logic 502 may provide control commands to the actuators 504a-n to accomplish one or more programmed tasks. Those control commands include commands that direct the actuators 504a-n to move to traverse one or more trajectories generated according to techniques described herein. Moreover, the logic 502 may optionally determine positions and/or other motion states of one or more actuators 504a-n, end effector 506, and/or a reference point based on sensor feedback and/or other techniques and provide indications of the motion states to trajectory generation system 550 to enable the trajectory generation system 550 to generate trajectories in view of the motion states according to techniques described herein.

Trajectory generation system 550 may include components of one or computing systems connected by one or more networks (not depicted) and may generate trajectories according to techniques described herein. An example of such a computing system is depicted schematically in FIG. 7. Various modules or engines may be implemented as part of trajectory generation system 550 as software, hardware, or any combination of the two. For example, in FIG. 5 trajectory generation system 550 includes a real time trajectory generator 552 and a trajectory optimizer 554.

Real time trajectory generator 552 may be configured to generate a first segment of a trajectory toward a waypoint. In some implementations, at least portions (e.g., all) of the first segment is generated by the real time trajectory generator 552 in a single control cycle of the robot. In some implementations, the real time trajectory generator 552 utilizes a real time online trajectory algorithm to calculate a locally time optimal trajectory. For example, the real time trajectory generator may use a real time online trajectory algorithm that utilizes one or more motion libraries to calculate a trajectory that is time optimal for the current motion states for the actuators.

In some implementations, the real time trajectory generator 552 determines asymmetric acceleration constraints for each of one or more actuators 504a of the robot 500 based on the current motion states for the actuators 504a of the robot. The motion states for the actuators 504a may be obtained, for example, based on sensor output of one or more sensors 508a-m of the robot 500 and/or other feedback signal from the robot 500. In some implementations, the real time trajectory generator 552 determines torque constraints based on current motion states for the actuators, and determines the asymmetric acceleration constraints based on the torque constraints. In some of those implementations, the real time trajectory generator 552 determines the torque constraints in view of torque constraints mapping 560 that defines, for each of a plurality of motion states of the robot, maximum and minimum torque vectors for actuators of the robot in the motion state.

Trajectory optimizer 554 may be configured to generate a second segment of a trajectory while the robot 500 is traversing the first segment determined by the real time trajectory generator 552. The trajectory optimizer 554 determines the second segment from an end point of the first segment to a last waypoint of a set of waypoints (or to another intermediate waypoint). The trajectory optimizer determines 554 the second segment based on anticipated motion states provided by the real time trajectory generator 552, based on the optimization parameters of the trajectory optimizer 554, and optionally based on other parameters. Various techniques may be utilized by the trajectory optimizer to generate the second segment. As one specific example, the second segment may be generated utilizing techniques based on Covariant Hamiltonian Optimization for Motion Planning (CHOMP).

While robot 500 and trajectory generation system 550 are depicted separately in FIG. 5, this is not meant to be limiting. In various implementations, one or more aspects depicted in FIG. 5 as implemented on one of robot 500 or trajectory generation system 550 may be implemented on the other, may be distributed across both, and/or may be distributed across one or both in combination with other components not depicted in FIG. 5. In implementations where robot 500 and trajectory generation system 550 are separate, they may communicate over one or more wired or wireless networks (not depicted) or using other wireless technology, such as radio, Bluetooth, infrared, etc. In other implementations, trajectory generation system 550 may be implemented entirely or in part using logic 502 of robot 500.

Figure 6:
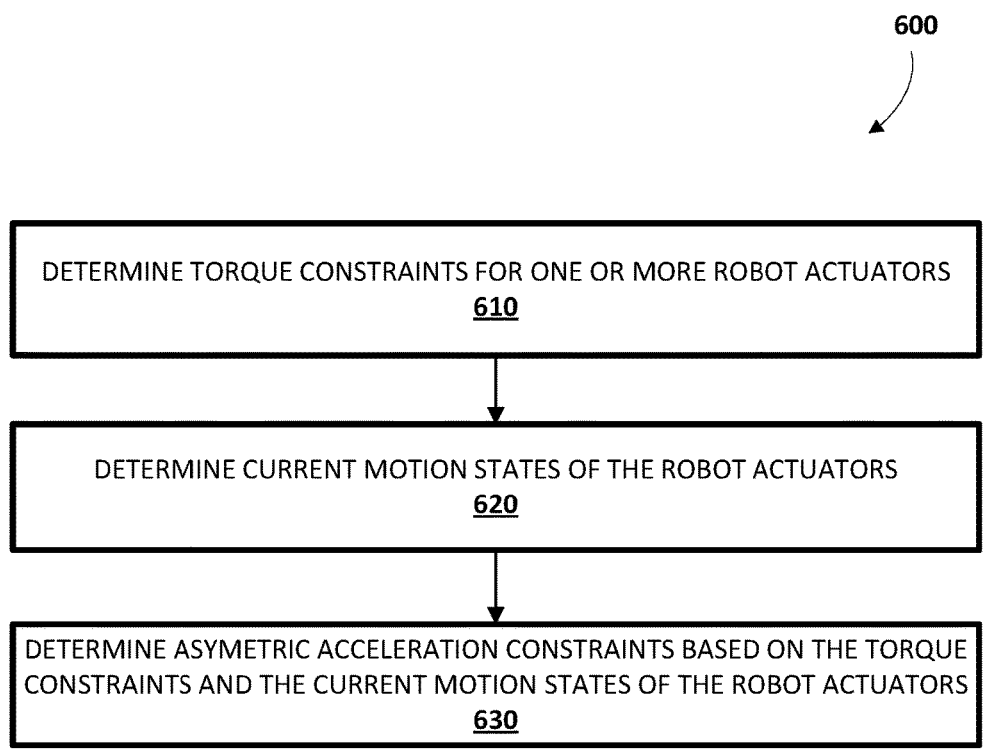
FIG. 6 depicts a flow chart illustrating an example method of determining asymmetric acceleration constraints based on the motion states of one or more robot actuators.

Referring now to FIG. 6, an example method 600 of determining asymmetric acceleration constraints based on the motion states of one or more robot actuators is described. For convenience, the operations of the method 600 are described with reference to a system that performs at least some of the operations and is described with reference to a robot in which the system is incorporated and/or with which the system communicates. This system may include various components, such as trajectory generation system 550 and/or logic 502 in FIG. 5. While operations of method 600 are shown in a particular order, this is not meant to be limiting. One or more operations may be reordered, omitted or added.

At block 610, the system determines torque constraints for one or more robot actuators. In some implementations, the torque constraints for one or more of the robot actuators may be symmetric. In some implementations, the torque constraints for one or more of the robot actuators may be asymmetric. In some implementations, the torque constraints for a given robot actuator are fixed constraints determined, for example, based on torque specifications for the given robot actuator, and stored in torque constraints mapping 560. In some implementations, the torque constraints for a given robot actuator of the actuators may be dynamic and dependent on the motion state for the given robot actuator (e.g., dependent on the velocity for the given robot actuator). In some of those implementations, the torque constraints (symmetric or asymmetric) for a given robot actuator for a given motion state may be determined in view of a mapping for the robot (e.g., torque constraints mapping 560) that defines, for each of a plurality of motion states of the robot, maximum and minimum torque vectors for the given robot actuator (and optionally additional robot actuators) in the motion state.

At block 620, the system determines current motion states of robot actuators. For example, the system may obtain the current motion states based on sensor output of one or more sensors of the robot and/or other feedback signal from the robot. Note that the velocity and acceleration constraints of the current motion states will be "null" if the actuators are not in motion (but the motion states will define non-null positions for the actuators), whereas the velocity and acceleration constraints for one or more of the actuators will not be "null" if the robot is in motion.

At block 630, the system determines asymmetric acceleration constraints based on the torque constraints and based on the current motion states of the robot actuators. In some implementations, the system determines the asymmetric acceleration constraints based on the torque constraints, the current motion states, and based on an inverse dynamic model of the robot with components for inertial, gravitational, centrifugal, and Coriolis forces/torques. In some implementations, the system may utilize a mass matrix that maps actuator forces/torques to acceleration constraints, taking into account additional force/torque constraints as an offset. In some implementations, the system may utilize a forward dynamic model of the robot that enables computation of a torque space on given motion states for actuators to determine the asymmetric acceleration constraints. For example, a first call of the forward dynamic model with maximum torque constraints for each of the actuators in a first direction may be utilized to determine a vector of maximum acceleration constraints in the first direction. A second call of the forward dynamic model with maximum torque constraints for each of the actuators in a second direction opposite to the first direction may be utilized to determine a vector of maximum acceleration constraints in the second direction. The asymmetric acceleration constraints may be based on the two maximum acceleration constraints vectors. For example, each of the vectors may be utilized as the asymmetric acceleration constraints and/or the values of the vectors may be reduced by a certain value or percentage and the reduced values utilized. Reducing the values of the vectors may ensure that the values will be achieved at the "handoff" to the second segment of the trajectory since the motion state at control cycle #1 is used in determining the acceleration constraints vectors (and the achievable acceleration constraints at the handoff point in some instances may vary from those of the "current" motion state).

Figure 7:
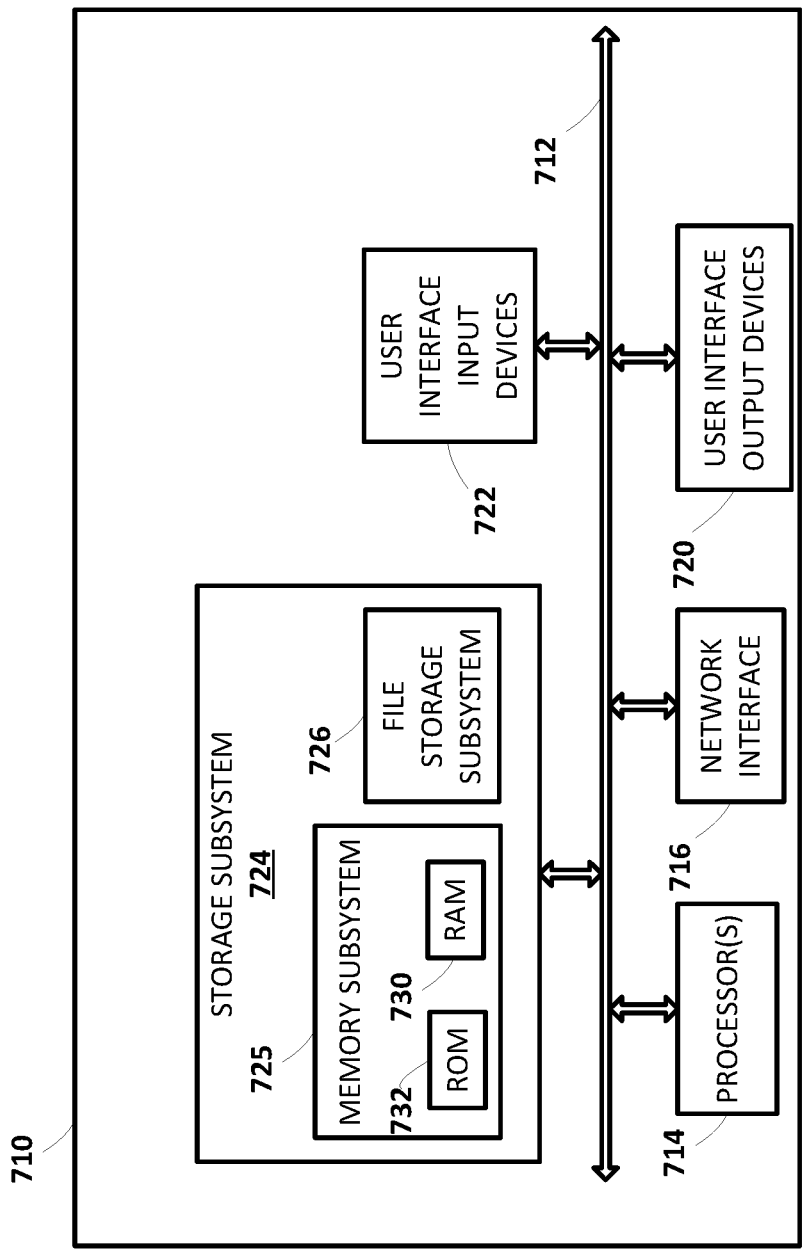
FIG. 7 schematically depicts an example architecture of a computer system.

FIG. 7 is a block diagram of an example computer system 710. Computer system 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computer system 710. Network interface subsystem 716 provides an interface to outside networks and is coupled to corresponding interface devices in other computer systems.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 710 to the user or to another machine or computer system.

Storage subsystem 724 stores programming and data constructs that provide the functionality of some or all of the modules described herein. For example, the storage subsystem 724 may include the logic to perform selected aspects of method 100, method 600, and/or to implement one or more aspects of logic 502, engine 552, and/or engine 554.

Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a CD-ROM drive, an optical drive, or removable media cartridges. Modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computer system 710 communicate with each other as intended. Although bus subsystem 712 is shown schematically as a single bus, alternative implementations of the bus subsystem may use multiple busses.

Computer system 710 can be of varying types including a workstation, server, computing cluster, blade server, server farm, smart phone, smart watch, smart glasses, set top box, tablet computer, laptop, or any other data processing system or computing device. Due to the ever-changing nature of computers and networks, the description of computer system 710 depicted in FIG. 7 is intended only as a specific example for purposes of illustrating some implementations. Many other configurations of computer system 710 are possible having more or fewer components than the computer system depicted in FIG. 7.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method of generating a trajectory for a robot, comprising:
    identifying a plurality of sequential waypoints;
    generating, by a real time trajectory generator, a first segment of a trajectory toward a first waypoint of the waypoints, the first segment indicating one or more motion states of actuators of the robot at each of a plurality of times, wherein at least a portion of the first segment is generated by the real time trajectory generator within a control cycle of the robot and wherein the first segment is generated based on the first waypoint and based on one or more kinematic motion constraints of the robot;
    providing, to a trajectory optimizer, anticipated motion states of the motion states of the actuators, the anticipated motion states being the motion states of the first segment for a target time of the plurality of times;
    operating the actuators of the robot based on the first segment until the target time;
    generating, by the trajectory optimizer and during the operating of the actuators of the robot based on the first segment, a second segment of the trajectory toward a last waypoint of the waypoints, the second segment indicating the motion states of the actuators of the robot at each of a plurality of second segment times following the target time, the second segment generated based on one or more of the waypoints, based on one or more optimization parameters, and based on the anticipated motion states provided to the trajectory optimizer; and
    operating the actuators of the robot based on the second segment following the target time.

2. The method of claim 1, further comprising:
    determining current motion states for the actuators of the robot in the control cycle of the robot in which the first segment is generated; and
    determining asymmetric acceleration constraints for one or more of the actuators based on the current motion states for the actuators of the robot;
    wherein the kinematic motion constraints utilized in generating the first segment comprise values based on the asymmetric acceleration constraints.

3. The method of claim 2, wherein the values based on the asymmetric acceleration constraints are the determined asymmetric acceleration constraints.

4. The method of claim 2, further comprising:
    reducing the asymmetric acceleration constraints by a percentage or a value to generate the values based on the asymmetric acceleration constraints.

5. The method of claim 2, wherein determining the asymmetric acceleration constraints for the one or more of the actuators based on the current motion states for the actuators of the robot comprises:
    determining torque constraints for the one or more of the actuators based on the current motion states for the actuators of the robot; and
    determining the asymmetric acceleration constraints based on the torque constraints.

6. The method of claim 5, wherein determining the asymmetric acceleration constraints based on the torque constraints comprises:
    determining first direction acceleration constraints of the asymmetric acceleration constraints during a call of a forward dynamic model of the robot based on the current motion state and first direction torque values of the torque constraints; and
    determining second direction acceleration constraints of the asymmetric acceleration constraints during a separate call of the forward dynamic model of the robot based on the current motion state and second direction torque values of the torque constraints.

7. The method of claim 1, wherein operating the actuators of the robot based on the first trajectory starts in or before a next control cycle of the robot that immediately follows the control cycle of the robot in which the at least the portion of the first segment is generated.

8. The method of claim 1, wherein providing the anticipated motion states to the trajectory optimizer occurs within the control cycle of the robot in which the at least the portion of the first segment is generated.

9. The method of claim 1, wherein the real time trajectory generator generates the first segment to achieve a locally time optimal trajectory for the current motion state.

10. The method of claim 1, wherein the kinematic constraints based on which the real time trajectory generator generates the first segment exclude torque constraints.

11. The method of claim 10, wherein the trajectory optimizer generates the second segment based on the torque constraints.

12. The method of claim 1, further comprising:
identifying a plurality of overriding sequential new waypoints during the operating of the actuators of the robot based on the second segment;
in response to identifying the new waypoints during the operating of the actuators of the robot based on the second segment:
generating, by the real time trajectory generator, a third segment of a new trajectory toward a new first waypoint of the new waypoints, the third segment indicating the motion states of the actuators of the robot at each of a plurality of third segment times;
providing, to the trajectory optimizer, third segment anticipated motion states of the motion states of the actuators, the third trajectory anticipated motion states being the motion states of the third segment for a third segment target time of the plurality of third segment times;
operating the actuators of the robot based on the third segment until the third segment target time;
generating, by the trajectory optimizer during the operating of the actuators of the robot based on the third segment, a fourth segment of the new trajectory, the fourth segment generated based on the one or more optimization parameters and based on the third segment anticipated motion states provided to the trajectory optimizer; and
operating the actuators of the robot based on the fourth segment following the third segment target time.

13. The method of claim 12, wherein identifying the new waypoints is in response to a sensor event of the robot during the operating of the actuators of the robot based on the second segment.

14. The method of claim 13, wherein the sensor event indicates an obstacle that was not present during the generating of the second segment by the trajectory optimizer.

15. The method of claim 1, further comprising:
generating, by the trajectory optimizer during the operating of the actuators of the robot based on the second segment, a third segment of the trajectory toward the last waypoint, the third segment indicating the motion states of the actuators of the robot at each of a plurality of third segment times following a second segment target time of the second segment times, the third segment generated based one or more optimization parameters and based on second segment anticipated motion states, the second segment anticipated motion states being the motion states of the second segment for the second segment target time; and
operating the actuators of the robot based on the third segment following the second trajectory target time.

16. A robotic system comprising:
a plurality of actuators;
logic providing control commands to the actuators to control the actuators;
a real time trajectory generator configured to generate a first segment of a trajectory toward a first waypoint of a plurality of sequential waypoints, the first segment indicating one or more motion states of the actuators at each of a plurality of times;
wherein the real time trajectory generator generates at least a portion of the first segment within a control cycle and wherein the first segment is generated based on the first waypoint and based on one or more kinematic motion constraints;
wherein the logic provides control commands to the actuators to operate the actuators based on the first segment until the target time;
a trajectory optimizer configured to generate, during the operating of the actuators of the robot based on the first segment, a second segment of the trajectory toward a last waypoint of the waypoints, the second segment indicating the motion states of the actuators of the robot at each of a plurality of second segment times following the target time;
wherein the trajectory optimizer generates the second segment based on one or more of the waypoints, based on one or more optimization parameters, and based on anticipated motion states, the anticipated motion states being the motion states of the first segment for a target time of the plurality of times; and
wherein the logic provides control commands to the actuators to operate the actuators based on the second segment following the target time.

17. The system of claim 16, wherein the real time trajectory generator is further configured to:
determine current motion states for the actuators in the control cycle of the robot in which the first segment is generated; and
determine asymmetric acceleration constraints for one or more of the actuators based on the current motion states for the actuators of the robot;
wherein the kinematic motion constraints utilized in generating the first segment comprise values based on the asymmetric acceleration constraints.

18. The system of claim 16, wherein in response to identifying a plurality of overriding sequential new waypoints during the operating of the actuators of the robot based on the second segment:
the real time trajectory generator is further configured to generate a third segment of a new trajectory toward a new first waypoint of the new waypoints, the third segment indicating the motion states of the actuators of the robot at each of a plurality of third segment times;
wherein the logic provides control commands to the actuators to operate the actuators based on the third segment until the third segment target time;
the trajectory optimizer is further configured to generate, during the operating of the actuators of the robot based on the third segment, a fourth segment of the new trajectory;
wherein the trajectory optimizer generates the fourth segment based on the one or more optimization parameters and based on third segment anticipated motion states, the third trajectory anticipated motion states being the motion states of the third segment for a third segment target time of the plurality of third segment times; and
wherein the logic provides control commands to the actuators to operate the actuators based on the fourth segment following the third segment target time.

19. The system of claim 17, wherein the trajectory optimizer is further configured to:

generate, during the operating of the actuators of the robot based on the second segment, a third segment of the trajectory toward the last waypoint, the third segment indicating the motion states of the actuators of the robot at each of a plurality of third segment times following a second segment target time of the second segment times; and wherein the trajectory optimizer generates the third segment based one or more optimization parameters and based on second segment anticipated motion states, the second segment anticipated motion states being the motion states of the second segment for the second segment target time;

wherein the logic provides control commands to the actuators to operate the actuators based on the third segment following the second trajectory target time.

20. At least one non-transitory computer readable medium comprising instructions that, in response to execution of the instructions, cause the following operations to be performed:

identifying a plurality of sequential waypoints;

generating, by a real time trajectory generator, a first segment of a trajectory toward a first waypoint of the waypoints, the first segment indicating one or more motion states of actuators of the robot at each of a plurality of times, wherein at least a portion of the first segment is generated by the real time trajectory generator within a control cycle of the robot and wherein the first segment is generated based on the first waypoint and based on one or more kinematic motion constraints of the robot;

providing, to a trajectory optimizer, anticipated motion states of the motion states of the actuators, the anticipated motion states being the motion states of the first segment for a target time of the plurality of times;

operating the actuators of the robot based on the first segment until the target time;

generating, by the trajectory optimizer and during the operating of the actuators of the robot based on the first segment, a second segment of the trajectory toward a last waypoint of the waypoints, the second segment indicating the motion states of the actuators of the robot at each of a plurality of second segment times following the target time, the second segment generated based on one or more of the waypoints, based on one or more optimization parameters, and based on the anticipated motion states provided to the trajectory optimizer; and operating the actuators of the robot based on the second segment following the target time.

* * * * *